(12) United States Patent
Rodriguez et al.

(10) Patent No.: US 9,032,491 B2
(45) Date of Patent: *May 12, 2015

(54) MULTI-FACTOR AUTHENTICATION ENROLLMENT OPTIMIZATION METHOD AND APPARATUS

(71) Applicant: Delfigo Corporation, Boston, MA (US)

(72) Inventors: Raphael A. Rodriguez, Quincy, MA (US); Julian D. Spring, Allston, MA (US); Daniel Volovik, Glenview, IL (US)

(73) Assignee: Delfigo Corporation, Boston, MA (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/862,719

(22) Filed: Apr. 15, 2013

(65) Prior Publication Data

US 2013/0232562 A1    Sep. 5, 2013

Related U.S. Application Data

(63) Continuation-in-part of application No. 13/772,768, filed on Feb. 21, 2013, which is a continuation of application No. 13/222,468, filed on Aug. 31, 2011, now Pat. No. 8,407,774.

(51) Int. Cl.
*H04L 29/06* (2006.01)
*G06F 21/32* (2013.01)
*G06F 21/31* (2013.01)

(52) U.S. Cl.
CPC .............. *G06F 21/32* (2013.01); *G06F 21/316* (2013.01)

(58) Field of Classification Search
None
See application file for complete search history.

(56) References Cited

U.S. PATENT DOCUMENTS

| 8,407,774 B2 | 3/2013 | Rodriguez et al. |
| 2004/0187037 A1 | 9/2004 | Checco |
| 2009/0150992 A1 | 6/2009 | Kellas-Dicks et al. |
| 2013/0167216 A1 | 6/2013 | Rodriguez |

*Primary Examiner* — Brandon Hoffman
(74) *Attorney, Agent, or Firm* — Maine Cernota & Rardin

(57) ABSTRACT

A method and system for the identification of a user is provided by collecting a series of user enrollment data from a series of user inputs; calculating a user profile from the series of user enrollment data and additional user data, the additional user data being randomly selected user enrollment data from the series of user enrollment data; comparing a post-training user login to the user profile; updating the user profile with data from the post training user login if the post-training login is consistent with the user profile; repeating the comparing and the updating for each successive post training user login.

14 Claims, 5 Drawing Sheets

MULTI-FACTOR AUTHENTICATION ENROLLMENT OPTIMIZATION METHOD AND APPARATUS

RELATED APPLICATIONS

This application is a continuation-in-part of U.S. application Ser. No. 13/772,768 filed on Feb. 21, 2013, issued U.S. Pat. No. 8,914,862 B2 issued Dec. 16, 2014 itself a continuation of U.S. application Ser. No. 13/222,468, filed Aug. 31, 2011, issued U.S. Pat. No. 8,407,774 B2 issued Mar. 26, 2013. These applications are herein incorporated by reference in their entirety for all purposes.

FIELD OF THE INVENTION

The invention relates to user access and authentication, and more particularly, to a system for authentication of a user during login to a computer system, device or smartphone.

BACKGROUND OF THE INVENTION

Known systems for identification of a user include the use of personal behavior. Information about the user's physiology may be collected, including flight time between keys, key dwell duration, as well as data relating to geographical location, IP address, and other information indicative of the hardware, software and communication protocols through which the system, device or smartphone is accessed. Notably, known systems collect such data in tables, which are periodically updated, thereby refining the dataset and improving the accuracy of identification with successive iterations.

With the growth of cloud computing and other high user count systems, which could be in the hundreds of millions or billions using systems from companies such as Facebook, Google and Twitter, storing a statistically significant sample of logins for comparison when multiplied by the increased number of users results in huge drains on processing resources, related to CPU, memory, bus circuit board speed, and data storage.

Enrollment of new users into a system using keystroke or touch based mobile biometrics requires training a limited number of initial entries, to establish a baseline, which can result in a user profile that expects a very narrow range of mathematical inputs after the initial training sequence is complete and then requires additional logins to "normalize" the baseline mathematics of the scoring. While additional enrollment entries produce improved baseline accuracy, it has been found that excessively long enrollments are undesirable.

What is needed, therefore, are techniques for efficiently confirming identity of users logging into a system.

SUMMARY OF THE INVENTION

One embodiment of the present invention provides a method for profiling a system user, the method comprising: enrolling a user, the enrolling a user including prompting a user to enter a response and measuring biometric data from the enrollment; repeating the enrolling the user a predetermined number of times, storing the biometric data; generating and storing user enrollment data from each the prompting of the user; calculating an aggregate user profile from a plurality of randomly selected sets of the biometric data from the enrollment.

Another embodiment of the present invention provides such a method wherein the randomly selected user enrollment data are incorporated into the calculation in a random order.

A further embodiment of the present invention provides such a method wherein the randomly selected user enrollment data are incorporated into the calculation in order in which they were collected.

Still another embodiment of the present invention provides such a method wherein the randomly selected user enrollment data are incorporated into the calculation in inverse order in which they were collected.

A still further embodiment of the present invention provides such a method wherein the calculating the fluctuations in the aggregate user profile fall below a preset threshold.

Even another embodiment of the present invention provides such a method wherein each the user enrollment data is used only once.

An even further embodiment of the present invention provides such a method wherein the user enrollment data sets are used a random number of times.

Yet another embodiment of the present invention provides such a method wherein the plurality is a predetermined number.

A yet further embodiment of the present invention provides such a method wherein the plurality is a number of iterations necessary until fluctuation in the aggregate profile is within an acceptable range.

One embodiment of the present invention provides a method for the identification of a user, the method comprising: collecting a series of user enrollment data from a series of user inputs; calculating a user profile from the series of user enrollment data and additional user data, the additional user data being randomly selected user enrollment data from the series if user enrollment data; comparing a post-training user login to the user profile; updating the user profile with data from the post training user login if the post-training login is consistent with the user profile; repeating the comparing and the updating for each successive post training user login.

Another embodiment of the present invention provides such a method wherein the randomly selected user enrollment data are incorporated into the calculation in a random order.

A further embodiment of the present invention provides such a method wherein fluctuations in the user profile fall below a preset threshold.

Even another embodiment of the present invention provides such a method wherein each the user enrollment data is used only once.

An even further embodiment of the present invention provides such a method wherein the user enrollment data are used a random number of times.

One embodiment of the present invention provides a system for the identification of a user, the system comprising: a training module, the training module configured to prompt a user for input of a plurality of training inputs from which the system collects a plurality of user enrollment data; the training module being configured to collect and calculate a confidence factor score from the plurality of user data and additional user data, the additional user data being user enrollment data from randomly selected training inputs; an access module, the access module configured to receive a user access login, and compare user access data from the user access login to the confidence factor score and calculate an updated confidence factor score from the confidence factor score and the user access data.

The features and advantages described herein are not all-inclusive and, in particular, many additional features and advantages will be apparent to one of ordinary skill in the art in view of the drawings, specification, and claims. Moreover, it should be noted that the language used in the specification

DETAILED DESCRIPTION

One embodiment of the present invention exhibits hysteresis, so the full time-ordered history of data collected for a user affects the scoring. Such an embodiment is able to optimize scoring by randomly selecting and submitting previously entered user patterns, thus fortifying the reference data before the user begins to receive a confidence factor score. The use of repetitious data from actual training inputs to supplement the actual measured training data set effectively weights the training data sufficiently to allow for improved stability or consistency of an initial confidence factor score for comparison with subsequent actual logins, which, in one embodiment are then used to update and adapt the score.

The system randomly selects previously recorded pattern entries from the patterns submitted by the user during their training period and resubmits them to be considered by the algorithm before subsequent login attempts following the training period, which are scored. The result is a more stable reference data set, for use at the point of the first score results and more consistent and accurate scoring that is instantly available to the organization using the technology following the training sequence which is completed by the end user to train the system to identify the end user.

The hysteresis in a method according to one embodiment of the present invention is an integral element of such a method—it allows the system to grow and adapt to the user over time and to assess input based on behavioral information about past behavior by the user. A high-dimensional enrollment phase space is used after training is complete to find the optimal starting user profile. Most of the individual phase paths in this space yield a sub-optimal choice for the average S score and its standard deviation, but by exploring this space by sampling random training requests, we are able to find the attractor in this phase space signifying the optimal choices of the training parameters.

Figure 1:
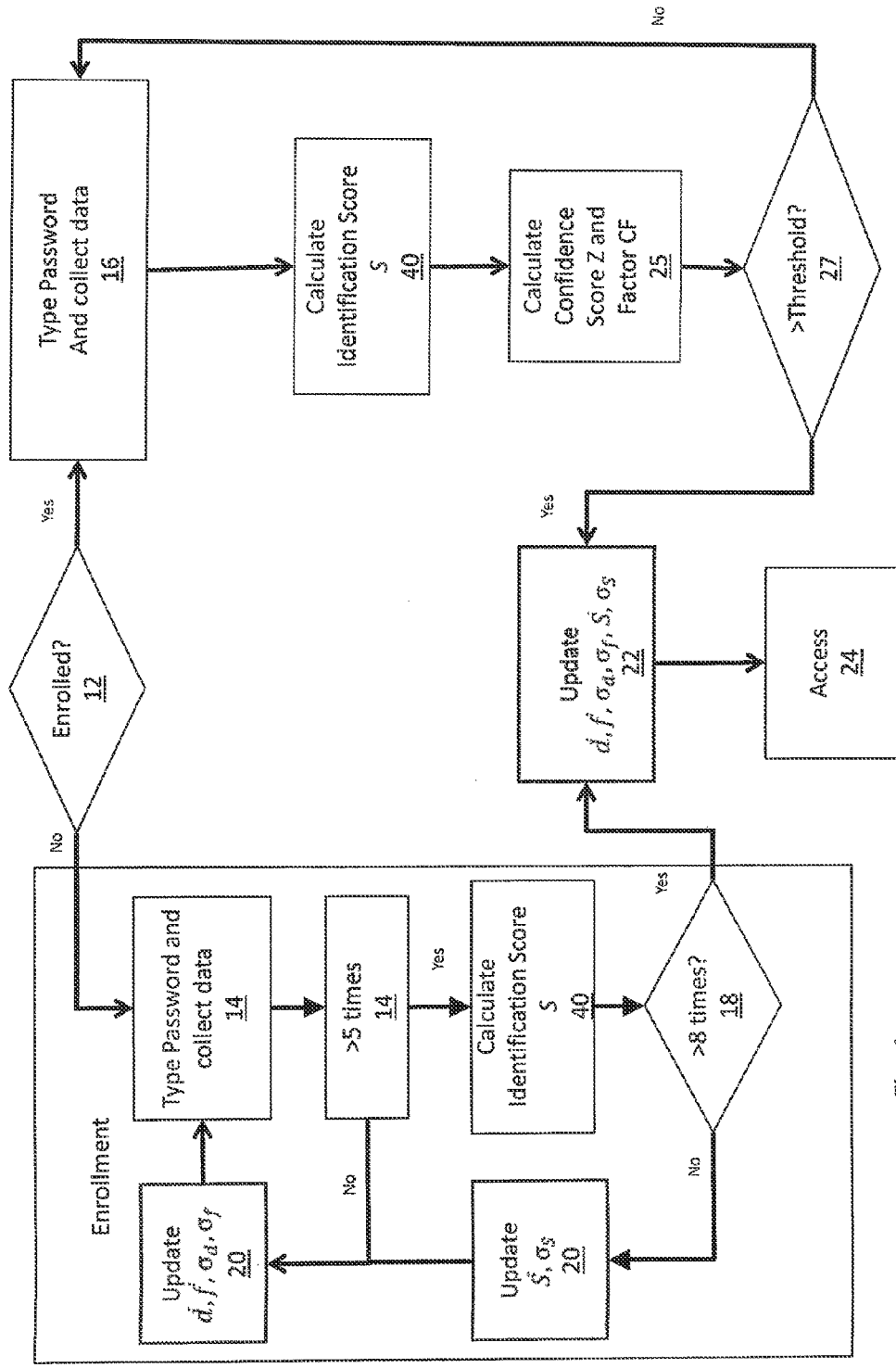
FIG. 1 is a block diagram illustrating a user verification system configured in accordance with one embodiment of the present invention.

In one embodiment of the present invention, illustrated in FIG. 1, a system, such as that disclosed in related U.S. application Ser. No. 13/222,468 is provided for the identification of a user. Users are divided between those for whom enrollment has already been achieved, and those who are as yet unenrolled 12. In such a system, users of each type are prompted to type a password, PIN, or other identification sequence 14, 16. Data for both groups of users related to the user's input of system access credentials such as a password, passcode, username, PIN and other system access credentials known to one skilled in the art is collected herein referred to as "password". Data collected includes time duration of each key stroke, known as dwell time, time duration between key strokes of particular alpha numeric letter, character, and symbol combinations known as key to key flight time. One skilled in the art will appreciate that "key strokes" as used in this application include touch events on touch screen and mobile devices as well as physical keyboards.

In one embodiment, dwell time may be the only characteristic considered, in which case the system may not measure flight time, or set the weighted flight time to zero.

For unenrolled users, upon entry of the password 14, the system checks to see if the user has accessed the system for at least a predetermined number of times 18, in one embodiment 8 times. In other embodiments different numbers of iterations may be utilized. If the system has not been accessed by the user for the predetermined number of times, the data is updated 20, as described in the context of FIG. 2, in a single pass and the user is prompted to repeat the password. This repeats until the predetermined number is reached. The enrollment process allows the system to acquire a statistically significant data set with which to compare subsequent logins. After adequate data has been collected to create a sample for comparison, the user is allowed to proceed, the comparison data is updated 22 as described in the context of FIG. 3 and the user is allowed access 24. As noted above, in some embodiments the enrollment or training method may utilize techniques to weight the measured training iterations to decrease the impact of single post training logins which would otherwise allow for disproportionate fluctuation in score.

Where the user has already been enrolled, the entry of the password 16 prompts the calculation of a confidence factor 26. Calculation of the confidence factor 25 is explained in greater detail with regard to FIG. 4. If the confidence factor 25 exceeds a predefined threshold number 27, the data set is updated 22 and the user is allowed access 24. Both dwell times and flight times may be transformed in units of standard deviation 32, 34. Dwell time 26 is the duration of time spent by the user on a particular key or keys, or device input known to one skilled in the art, while flight time 28 is the time spent by the user between key strokes or inputs. In one embodiment, the embodiment confidence factors may, by means of arbitrary constants, be set to fall within a range of 0 to 100, with a pass threshold arbitrarily set by the system administrator or automated based on workflow rules which are preset or dynamic in relationship to the data, whether individual, group or global dataset. One skilled in the art will appreciate that the confidence factor threshold may be set for a system, and is dependent not just on the degree of certitude desired, but also on the weight assigned to different data points and attributes collected.

Figure 2:
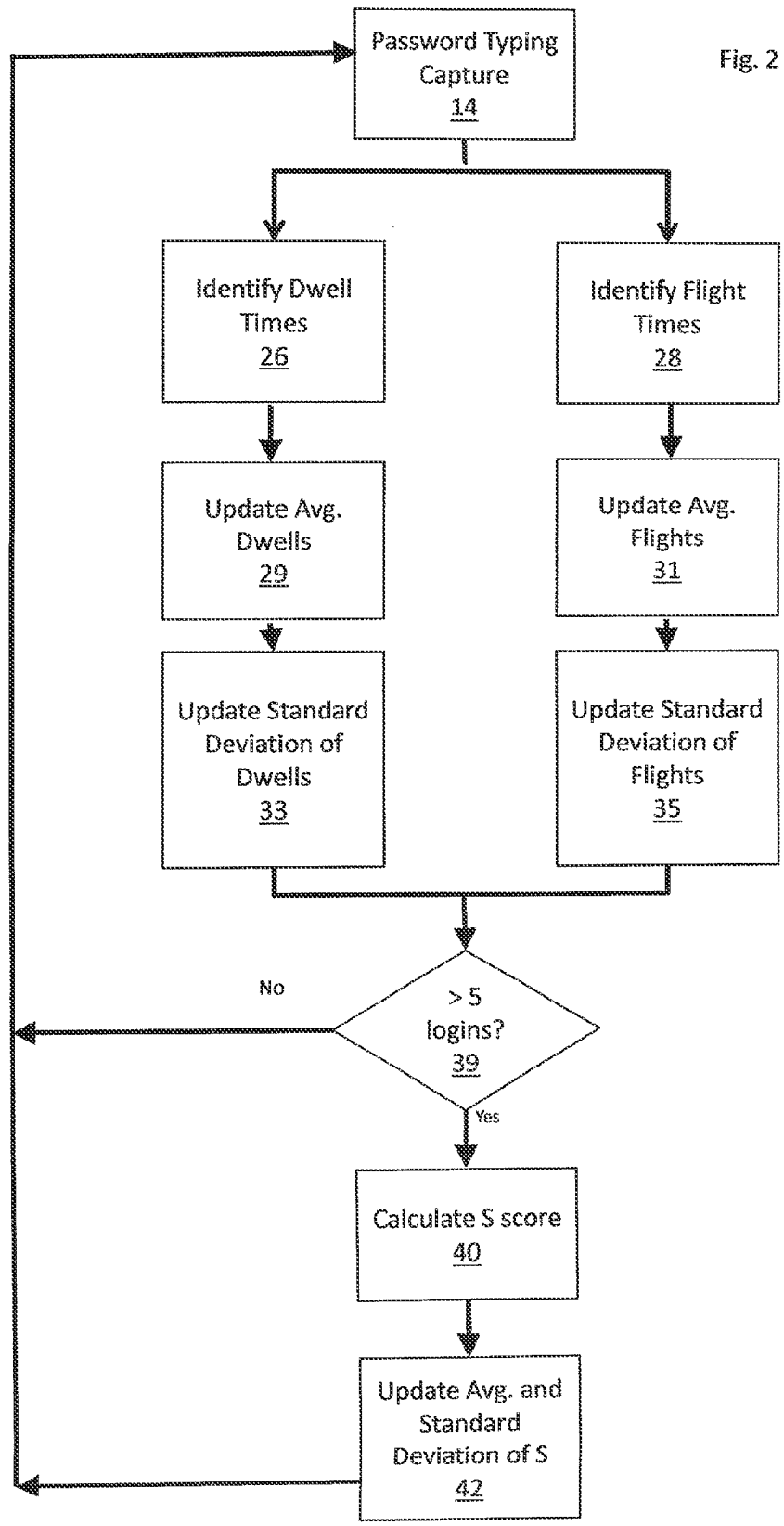
FIG. 2 is a block diagram illustrating a user enrollment component in a user verification system configured in accordance with one embodiment of the present invention.

In one enrollment embodiment, illustrated in FIG. 2, enrollment consists of 8 logins before the first confidence factor is calculated. In such an embodiment, at least the first 3 login attempts, but in some embodiments first 5 logins are only used to calculate $\bar{d}_i$, $\bar{f}_i$, $\sigma_{d_i}$, and $\sigma_{f_i}$. In embodiments with 5 initial data collection logins, after those five logins, logins numbers 6-8 are used to update $\bar{d}_i$, $\bar{f}_i$, $\sigma_{d_i}$ as well as to calculate:

$$x_i = \text{Minimum}\left[W_d \frac{|d_i - \bar{d}_i|}{\sigma_{d_i}}, 1\right]$$

and $$y_i = \text{Minimum}\left[W_f \frac{|f_i - \bar{f}_i|}{\sigma_{f_i}}, 1\right]$$

where $d_i$ and $f_i$ are the $i^{th}$ dwell and flight time respectively. Then the S score is calculated by $$S = \sum_{i=1}^{k} x_i + \sum_{i=1}^{k-1} y_i.$$

The first S score calculated (after the sixth login) is the starting value for $\bar{S}$. Then the S scores from logins 7-8 are used to update $\bar{S}$ where $$\bar{S}_{new} = \bar{S}_{old} + \frac{S - \bar{S}_{old}}{N_r - 5}$$

and find $\sigma_S$, to be used during the actual login process to calculate confidence factors. One skilled in the art would appreciate that more sampling iterations will improve accuracy, however, excessive iterations will inconvenience users. At this point the enrollment is over. In such an embodiment, there is no need to store a login pattern once that pattern has been used to update the relevant statistics. One skilled in the art will likewise appreciate that other scoring formulae are known which may be used to generate scores.

In an alternative embodiment the updating of a data set for a newly enrolled user comprises collection of various data including dwell times 26 and flight times 28. These factors are used to update average dwell times 29 and average flight times 31, and standard deviations of dwell times 33 and flight times 35. The process is repeated until, in one embodiment, a number of login attempts that is either statically pre-determined, or dynamically determined based on an external set of rules 39 have been made, thereby capturing sufficient data as to the users characteristic dwell time and flight time for a particular password on a particular machine. After the number of enrollment logins have been completed, the system calculates a score (S) for each login 40. The scores provide a measure of the degree of consistency of a particular login attempt in comparison to the average login for that user. Averages of the scores and standard deviation of the scores are then updated and stored 42 for future use. In those embodiments where it has not already been deleted, the data from which the S score is generated, i.e. the stored patterns of the initial login attempts are deleted, and the stored average and standard deviation Scores are retained.

Figure 5:
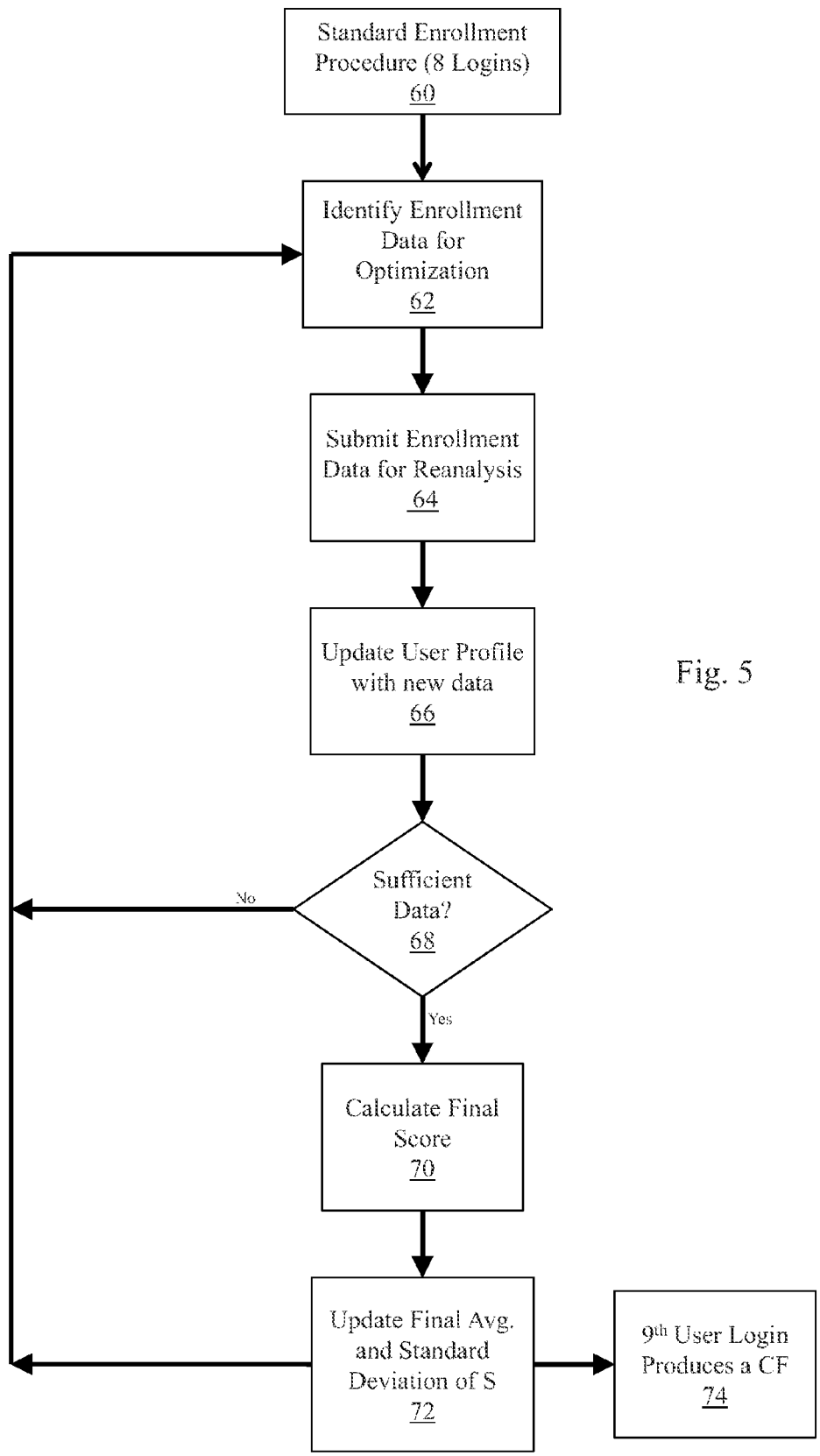
FIG. 5 is a block diagram illustrating the steps leading to a confidence factor calculation in a user verification system configured in accordance with an embodiment of the present invention.

As illustrated in FIG. 5, an enrollment training period may be utilized by increasing the data set used in login requests after the enrollment period through the inclusion of data from randomly selected login requests from the training login entries to supplement data used in the calculation of the confidence factor of the system. Thus on the ninth request, allowing the system to use a higher number of data points (24 in one embodiment) with only 8 previous requests made to the end user. If the user has not previously enrolled, they must complete the standard enrollment procedure 60. This procedure involves eight logins, where the password is typed. The data is then identified for optimization 62. It is further submitted for reanalysis 64. The user profile is then updated with the new data 66. If sufficient data is available 68, a final score is calculated 70. If sufficient data is not available 68, new enrollment data is identified for optimization 62, and the process continued until sufficient data is available to calculate a final score 70. After calculation of a final score the final average and standard deviation of S is calculated 72, and the cycle repeats, beginning with identifying enrollment data for optimization 62. On a ninth user login, a confidence factor will be produced 74.

Figure 4:
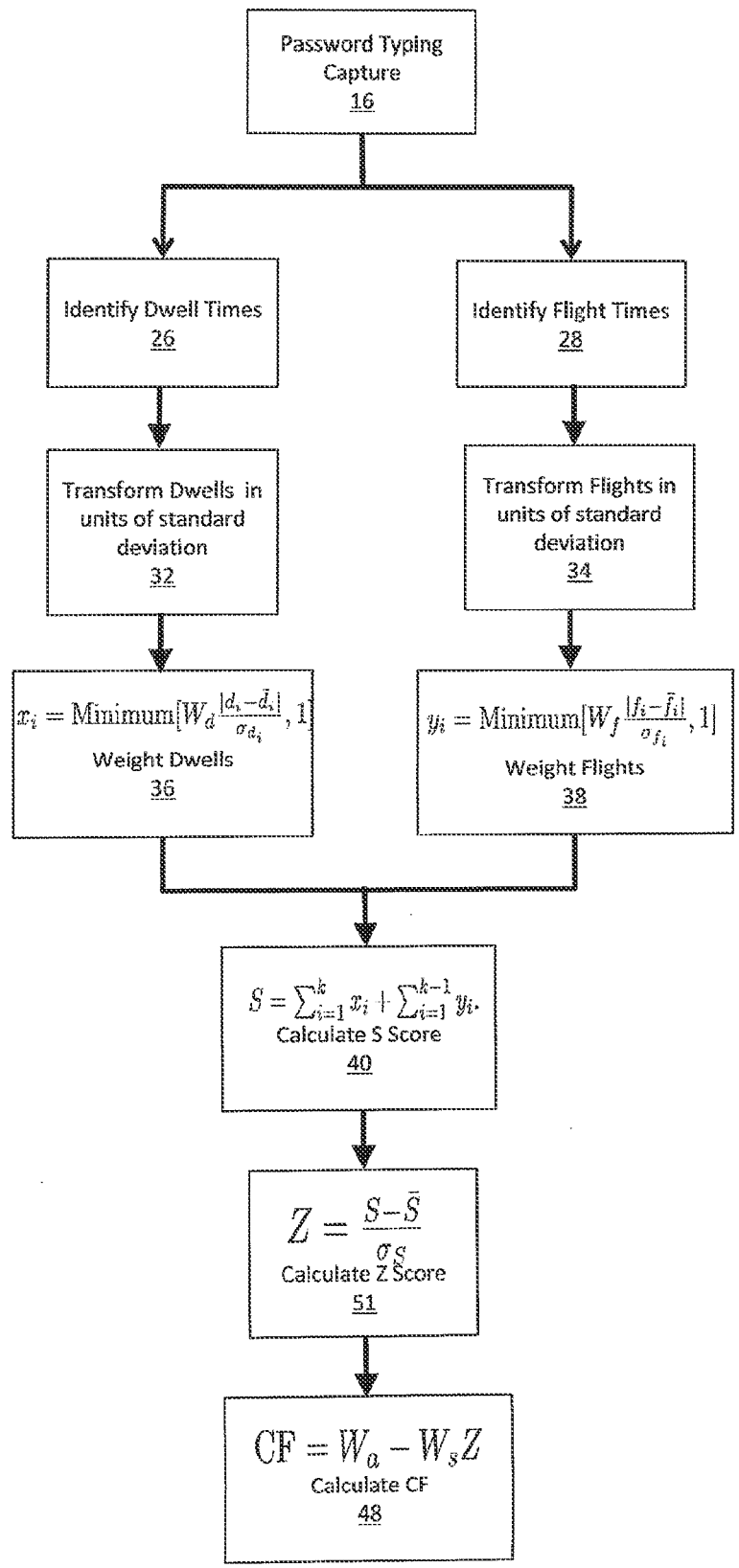
FIG. 4 is a block diagram illustrating a confidence factor calculator in a user verification system configured in accordance with one embodiment of the present invention.

In one embodiment, illustrated in FIG. 4, confidence factors for enrolled users are calculated. The password is typed 16 as in the enrollment process of FIG. 2, and both dwell times 26 and flight times 28 are measured. The standard deviation of the dwell time 33 and the flight time 35 are calculated. From the dwell time 26 and the flight time 28 and their respective standard deviations 33, 35 the weighted Dwells 36 and weighted Flights 38 are calculated. The sums of the weighted values are then used to calculate a score S 40. The score S 40 then forms the basis for calculation 51 of another score, a confidence score, Z, score Z being the difference between the score S and the average of scores S stored in the enrollment process and subsequently updated, divided by the standard Deviation of S, again drawn from stored values 42. In one embodiment this Z score can be converted 48 to a confidence factor CF as discussed above.

Figure 3:
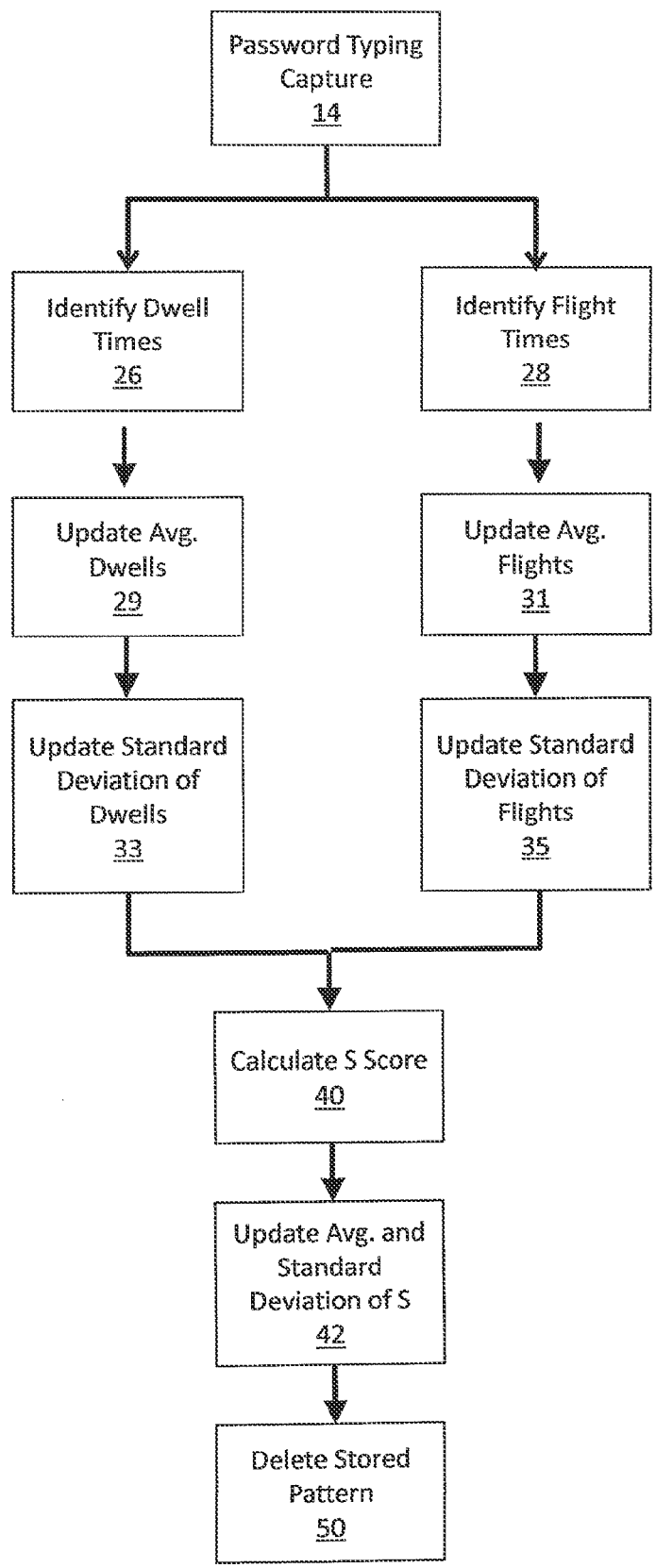
FIG. 3 is a block diagram illustrating a user data updating and storage component in a user verification system configured in accordance with one embodiment of the present invention.

As illustrated in FIG. 3, updating of the average and standard deviations of the login scores requires calculation 40 of the score S and the average of scores S stored in the enrollment process and subsequently updated, and the standard Deviation of S based on the new score S that was calculated as described above 42, and deleting 50 stored pattern data used to calculate the S score.

Cloud authentication processing provides a combination of login accuracy in the realm of using multifactor authentication of keystroke biometrics, device identification, and geographical-location based identification in relationship to the latency of login delay time because of the mathematical computation involved in processing millions of users over the Internet to access remote computer systems. This method of cloud authentication processing creates the highest known efficacy of end user login accuracy in relationship to end user login time to access remote computer systems.

Cloud authentication processing of one embodiment of the present invention supports the global movement for green technologies. As systems move from behind corporate firewalls and into massive cloud based data centers, designed to encompass the art of green design and architecture, the implementation and usage of cloud authentication processing enables the data center to decrease the amount of electrical power, HVAC, and systems needed to process multifactor based authentication of end-user identity using keystroke biometrics, device identification, and geographical-location based identification.

The size of the problem being solved in the current embodiment of cloud authentication processing green approach is an estimated ratio of 6:1, that is to say that in order to compute, process, transact and store data on the scale of 750 million users globally, as is the estimated user count of the company called Facebook, the storage capacity needed is roughly 265 terabytes of storage per month. With database storage comes a host of computer servers, devices, routers, and switches as well as a host of interdependent hardware, all of which consume electrical power and HVAC resources needed to maintain a steady state and uptime of this equipment. The cloud authentication processing green approach envisioned would decrease this storage amount to just 45 terabytes per month.

Using embodiments of the cloud authentication processing method described herein dramatically decreases this consumption because cloud authentication processing only requires one attribute string 8-10 kilobytes and a mathematical computation against a single stored instance of a prior end-user's login data, mathematics and attributes. Thus the embodiment of this method would save millions of dollars per data center in hardware equipment and an enormous amount of natural resources needed by companies, organizations and countries globally to power and cool this equipment without this cloud authentication processing approach.

|  | Estimation (High End) | CAP estimate | Remarks |
|---|---|---|---|
| Unique users | 750,000,000 | 750,000,000 | |
| KB/record | 15 | 10 | 15 Kb to capture keystroke, device and Geo ID. CAP process stores only 10 Kb |
| Records per user | 15 | 1 | This number is dependent on the upper max set in the admin configuration |
| Assuming 15% of the users going through Password resets and Background process archiving | 112,500,000.00 | 112,500,000.00 | |
| KB of data | 194,062,500,000 | 8,625,000,000 | |
| Daily average logins | 187,500,000 | 187,500,000 | 4:1 ratio of logins based on 750 Million unique users |
| KB per record | 15 | 7 | After the upper max is reached only Transaction log will be filled with the incoming data. No more additions in User Attribute table |
| Daily increase in data records | 2812500000 | 1312500000 | |
| KB in a GB | 1,048,576 | 1,048,576 | |
| GB | 185072.422 | 8225.440979 | Static load |
| GB | 2682.209015 | 1251.69754 | Daily increase in load |
| days in a month | 30 | 30 | |
| GB/Month | 265538.6925 | 45776.36719 | |
| GB in TB | 1000 | 1000 | |
| TB/Month | 265.5386925 | 45.77636719 | Savings of 5.8 times more efficient |
| Assumes data is stored online for a month | | | |

One embodiment of the present invention provides a system for the identification of users, the system comprising: an enrollment processor, whereby initial login attempts by the user are measured, and data identifying the user are collected for a specific device and location; the enrollment processor being configured to collect the identifying data and create a first login score, an iterative average login score, and an iterative standard deviation of the login score; an enrolled login processor, the enrolled login processor being configured to measure dwell time on keys in a login sequence and to calculate weighted dwell time from the dwell time; a login score calculator, the calculator taking the weighted dwell time and generating an actual login score; a login confidence comparator, the login confidence comparator comprising a processor whereby a comparison score is generated as a function of the actual login score, the iterative average login score, and the iterative standard deviation of the login score.

In such an embodiment the enrolled login processor may be further configured to measure flight time between the keys in the login sequence and to calculate weighted flight time from the flight time; and wherein the login score calculator is configured to take the weighted flight time and the weighted dwell time to generate an actual login score.

Such an embodiment may include an updater, whereby the iterative average login score and iterative standard deviation are updated after each login, and data used in calculating the login score is deleted and may provide a system wherein the confidence login generator identifies login attempts exceeding a desired degree of identity confidence and allows access to users making the login attempt. The weighted flight time may be $y_i$ where $W_f$ is a flight time weight, $f_i$ is a flight time for the $i^{th}$ key, $\bar{f}_i$ is an average flight time for the ith key, $\sigma_{f_i}$ is the standard deviation of $f_i$ and $$y_i = \text{Minimum}\left[W_f \frac{|f_i - \bar{f}_i|}{\sigma_{f_i}}, 1\right]$$

wherein $W_f=0.04$, but may be set to any other value, including zero. Similarly, weighted dwell time may be $x_i$ where $W_d$ is a dwell time weight, $d_i$ is a dwell time for the $i^{th}$ key, $\bar{d}_i$ is an average dwell time for the $i^{th}$ key, $\sigma_{d_i}$ is the standard deviation of $d_i$ and $$x_i = \text{Minimum}\left[W_d \frac{|d_i - \bar{d}_i|}{\sigma_{d_i}}, 1\right].$$

An even further embodiment of the present invention provides such a system wherein $W_d=0.20$, but may also be adjusted to weight the dwell time either more or less relative to the flight time.

In one embodiment of the present invention a system wherein the actual login score may be give as S wherein $$S = \sum_{i=1}^{k} x_i + \sum_{i=1}^{k-1} y_i$$

wherein $x_i$ is a dwell time score for an $i^{th}$ key and $y_i$ is a flight time for an $i^{th}$ key, and k is the number of keystrokes entered. The comparison score may be Z wherein $\overline{S}$ is an average S and $\sigma_s$ is a standard deviation of S and $$Z = \frac{S - \overline{S}}{\sigma_S}.$$

In one embodiment, the method includes collecting enrollment data from the user including dwell times for each of an enrollment series of login attempts; creating an iterative unified identification score for the user from the dwell times of the enrollment series of login attempts; establishing an iterative average of the iterative unified identification score; establishing an iterative standard deviation of the iterative unified identification score; deleting the dwell times of the enrollment series of login attempts; prompting the user to login and collecting login specific dwell times; calculating a login identification score from the login specific dwell times; comparing the login identification score to the iterative unified identification score, and if the login identification score is consistent with the iterative unified identification score allowing access to the user; and updating the iterative unified identification score, the iterative average of the unified identification score and the iterative standard deviation of the unified identification score. It should be noted that the terms "iterative" and "rolling" are used to convey that the values thus indicated are updated with the values of successive login attempt and then the new updated value is used the next calculation.

Such a method may also include collecting flight times for each of the enrollment series of login attempts wherein the creating the iterative unified identification login score uses the flight time of the enrollment series of the login attempts; deleting the flight time of the enrollment series of login attempts.

Such an embodiment may incorporate calculating averages and standard deviations of the dwell time for each of an enrollment series of login attempts.

In one embodiment, the first unified identification score is a function of the averages and standard deviations of the dwell time for each of an enrollment series of login attempts. In one embodiment the login identification score is a function of the login specific dwell times.

Even another embodiment of the present invention provides such a method wherein the comparing the login identification score to the iterative unified identification score comprises calculating a confidence score, the confidence score being a function of the login identification score, the average of the login identification scores and the standard deviation of the login identification scores.

The collecting enrollment data in one embodiment comprises prompting a user for a series of calibration login attempts, detecting flight and dwell times, from the series of calibration login attempts, calculating starting average dwell times, starting average flight times, starting standard deviation dwell times, and starting standard deviation flight times.

In one embodiment of the present invention the iterative unified identification score is first calculated from the starting average dwell times, starting average flight times, starting standard deviation dwell times, and starting standard deviation flight times.

In such an embodiment of the present invention the iterative unified identification score can be calculated from a series of identification scores derived from score enrollment login attempts following the calibration login attempts and score enrollment login attempts can include at least three score enrollment login attempts.

One embodiment of the present invention provides a method of identifying a user, the method including identifying if the user is enrolled; if the user is not enrolled, enrolling the user by prompting the user to enter a system access credential, updating a login count, and collecting dwell and flight time data over a plurality of calibration entries, using the calibration entries to calculate starting averages and standard deviations of the dwell and flight time data, deleting the dwell and flight time data; prompting the user to enter a series of score calculation entries and updating the login count; collecting dwell and flight time data from each score calculation entry in the series of score calculation entries; calculating an identification score for each entry of the series of score calculation entries from the dwell and flight time data of each the score calculation entry; calculating rolling average and rolling standard deviations of the identification scores and updating the averages and standard deviations of the dwell and flight time data with the dwell and flight time data of each score calculation entry to create rolling average dwell and flight times and rolling standard deviations of dwell and flight times; if the user is enrolled, prompting the user for the system access credential in an access login attempt; collecting dwell and flight time data of the access login attempt; calculating the identification score from the dwell and flight time data from the access login attempt, the rolling average dwell time, the rolling average flight time, the rolling standard deviation dwell time and the rolling standard deviation flight time; comparing the identification score to the rolling average identification score and the rolling standard deviation identification score, if the identification score is within preset parameters, allowing access to the system, updating the rolling average dwell time, the rolling average flight time, the rolling average identification score, the rolling standard deviation dwell time, the rolling standard deviation flight time, the login count, and the standard deviation identification score.

One embodiment of the present invention may include the identification of a user may include generating an identification score based on dwell time of a login attempt; comparing the identification score against a stored average identification score and a standard deviation identification score.

In one embodiment of the present invention a method is provided for profiling a system user, the method comprising: enrolling a user, the enrolling a user including prompting a user to enter a response and measuring biometric data from the enrollment; repeating the enrolling the user a predetermined number of times, storing the biometric data; generating and storing user enrollment data from each the prompting of the user; calculating an aggregate user profile from a plurality of randomly selected sets of the biometric data from the enrollment. Randomly selected user enrollment data in such a method may be incorporated into the calculation in a random order, in which they were collected or incorporated into the calculation in inverse order in which they were collected. The number of times duplicate data is used in the calculation may be determined by calculating the fluctuations in the aggregate user profile and determining if they fall below a preset threshold, if the fluctuation falls within acceptable limits.

While in some embodiments the user enrollment data is used only once, in others it may be repeated as many times as necessary to achieve a statistically stable sample. in some embodiments any one item of user enrollment data sets may be used a random number of times. While in others it is used a predetermined number of times, where a number of iterations necessary is determined by the fluctuation in the aggregate profile being within an acceptable range.

One embodiment of the present invention provides a method for the identification of a user, the method comprising: collecting a series of user enrollment data from a series of user inputs; calculating a user profile from the series of user enrollment data and additional user data, the additional user data being randomly selected user enrollment data from the series if user enrollment data; comparing a post-training user login to the user profile; updating the user profile with data from the post training user login if the post-training login is consistent with the user profile; repeating the comparing and the updating for each successive post training user login.

Another embodiment of the present invention provides such a method wherein the randomly selected user enrollment data are incorporated into the calculation in a random order.

A further embodiment of the present invention provides such a method wherein fluctuations in the user profile fall below a preset threshold.

Even another embodiment of the present invention provides such a method wherein each the user enrollment data is used only once.

An even further embodiment of the present invention provides such a method wherein the user enrollment data are used a random number of times.

One embodiment of the present invention provides a system for the identification of a user, the system comprising: a training module, the training module configured to prompt a user for input of a plurality of training inputs from which the system collects a plurality of user enrollment data; the training module being configured to collect and calculate a confidence factor score from the plurality of user data and additional user data, the additional user data being user enrollment data from randomly selected training inputs; an access module, the access module configured to receive a user access login, and compare user access data from the user access login to the confidence factor score and calculate an updated confidence factor score from the confidence factor score and the user access data.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for profiling a system user, said method comprising:
    enrolling a user, said enrolling a user including prompting a user to enter a response and measuring biometric data from said enrollment;
    repeating said enrolling said user a predetermined number of times, storing said biometric data;
    generating and storing user enrollment data from each said prompting of said user;
    calculating an aggregate user profile from a plurality of randomly selected sets of said biometric data from said enrollment.

2. The method of claim 1 wherein said randomly selected user enrollment data are incorporated into said calculation in a random order.

3. The method of claim 1 wherein said randomly selected user enrollment data are incorporated into said calculation in order in which they were collected.

4. The method of claim 1 wherein said randomly selected user enrollment data are incorporated into said calculation in inverse order in which they were collected.

5. The method of claim 1 wherein said calculating said fluctuations in said aggregate user profile fall below a preset threshold.

6. The method of claim 1 wherein each said user enrollment data is used only once.

7. The method of claim 1 wherein said user enrollment data sets are used a random number of times.

8. The method of claim 1 wherein said plurality is a predetermined number.

9. The method of claim 1 wherein said plurality is a number of iterations necessary until fluctuation in said aggregate profile is within an acceptable range.

10. A method for the identification of a user, said method comprising:
    collecting a series of user enrollment data from a series of user inputs;
    calculating a user profile from said series of user enrollment data and additional user data, said additional user data being randomly selected user enrollment data from said series if user enrollment data;
    comparing a post-training user login to said user profile;
    updating said user profile with data from said post training user login if said post-training login is consistent with said user profile;
    repeating said comparing and said updating for each successive post training user login.

11. The method of claim 10 wherein said randomly selected user enrollment data are incorporated into said calculation in a random order.

12. The method of claim 10 wherein fluctuations in said user profile fall below a preset threshold.

13. The method of claim 10 wherein each said user enrollment data is used only once.

14. The method of claim 10 wherein said user enrollment data are used a random number of times.

* * * * *